US011837981B2

(12) United States Patent
Schwarzkopf

(10) Patent No.: US 11,837,981 B2
(45) Date of Patent: Dec. 5, 2023

(54) METHOD FOR OPERATING A BRUSHLESS AND SENSORLESS MULTI-PHASE ELECTRIC MOTOR, AND DRIVE DEVICE WITH AN ELECTRIC MOTOR

(71) Applicant: Brose Fahrzeugteile SE & Co. Kommanditgesellschaft, Wuerzburg, Wuerzburg (DE)

(72) Inventor: Johannes Schwarzkopf, Marktheidenfeld (DE)

(73) Assignee: Brose Fahrzeugteile SE & Co. Kommanditgesellschaft, Wuerzburg, Wuerzburg (DE)

(*) Notice: Subject to any disclaimer, the term of this patent is extended or adjusted under 35 U.S.C. 154(b) by 0 days.

(21) Appl. No.: 17/721,546

(22) Filed: Apr. 15, 2022

(65) Prior Publication Data

US 2022/0247335 A1 Aug. 4, 2022

Related U.S. Application Data

(63) Continuation of application No. PCT/EP2020/078677, filed on Oct. 13, 2020.

(30) Foreign Application Priority Data

Oct. 15, 2019 (DE) ...................... 10 2019 215 853.6

(51) Int. Cl.
*H02P 21/09* (2016.01)
*H02P 21/13* (2006.01)

(52) U.S. Cl.
CPC .............. *H02P 21/09* (2016.02); *H02P 21/13* (2013.01)

(58) Field of Classification Search
CPC ...... H02P 21/09; H02P 21/13; H02P 2207/05; H02P 6/18; H02P 21/24
USPC .................................... 318/139, 400.01, 700
See application file for complete search history.

(56) References Cited

U.S. PATENT DOCUMENTS

| | | | | |
|---|---|---|---|---|
| 5,729,113 A * | 3/1998 | Jansen | ..................... | H02P 21/18 318/798 |
| 8,174,222 B2 * | 5/2012 | Patel | ....................... | H02P 29/60 477/3 |
| 10,075,107 B2 * | 9/2018 | Lepka | ........................ | H02P 6/18 |
| 10,224,843 B2 | 3/2019 | Hano | | |
| 10,305,406 B2 * | 5/2019 | Sato | ......................... | H02P 8/16 |
| 10,541,632 B2 | 1/2020 | Schneider | | |
| 2003/0062870 A1 | 4/2003 | Royak et al. | | |

(Continued)

FOREIGN PATENT DOCUMENTS

| DE | 102015102565 A1 | 8/2016 |
|---|---|---|
| DE | 112016001622 T5 | 1/2018 |

*Primary Examiner* — David Luo
(74) *Attorney, Agent, or Firm* — Laurence A. Greenberg; Werner H. Stemer; Ralph E. Locher

(57) ABSTRACT

A method for operating a brushless and sensorless multi-phase electric motor. At least two phase voltages and at least two phase currents of the electric motor are determined. A voltage vector is determined from the phase voltages and/or a current vector is determined from the phase currents. A position substitute signal is determined as a measure of a rotor position on the basis of an angle of the current vector and/or of the voltage vector. A rotation value is calculated on the basis of the position substitute signals, and the electric motor is controlled by open-loop and/or closed-loop technology on a basis of the rotation value.

14 Claims, 5 Drawing Sheets

(56) References Cited

U.S. PATENT DOCUMENTS

| | | |
|---|---|---|
| 2014/0210385 A1 | 7/2014 | Kozaki |
| 2015/0137720 A1 | 5/2015 | Kobayashi et al. |
| 2015/0222215 A1 | 8/2015 | Ishida |
| 2016/0359442 A1 | 12/2016 | Zhao et al. |

* cited by examiner

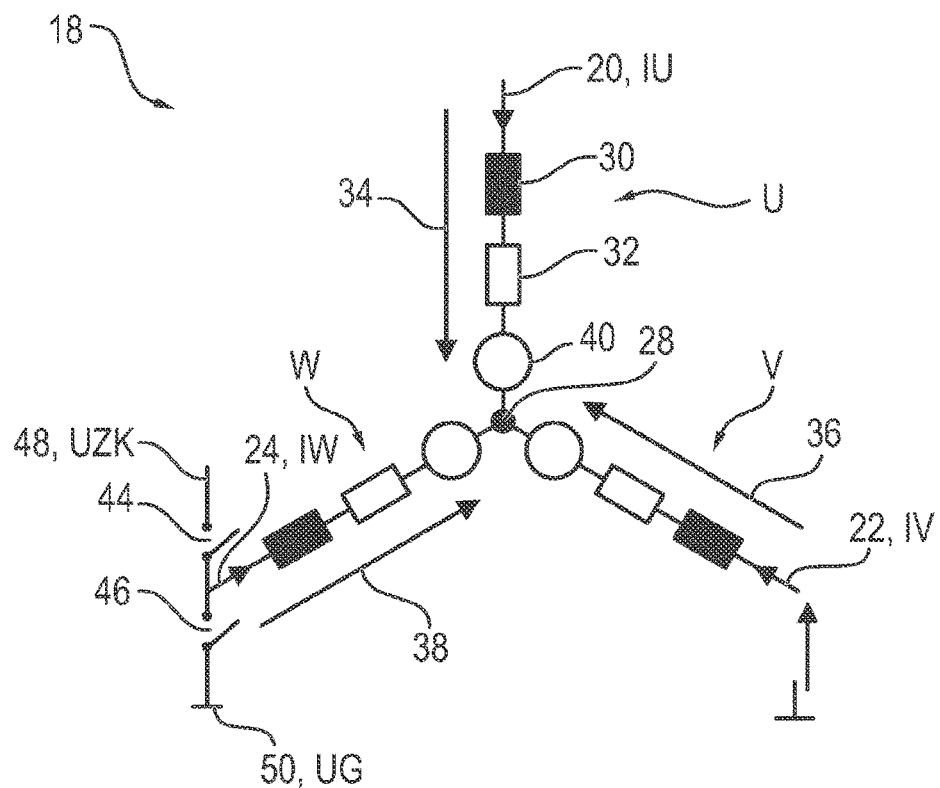
FIG. 3
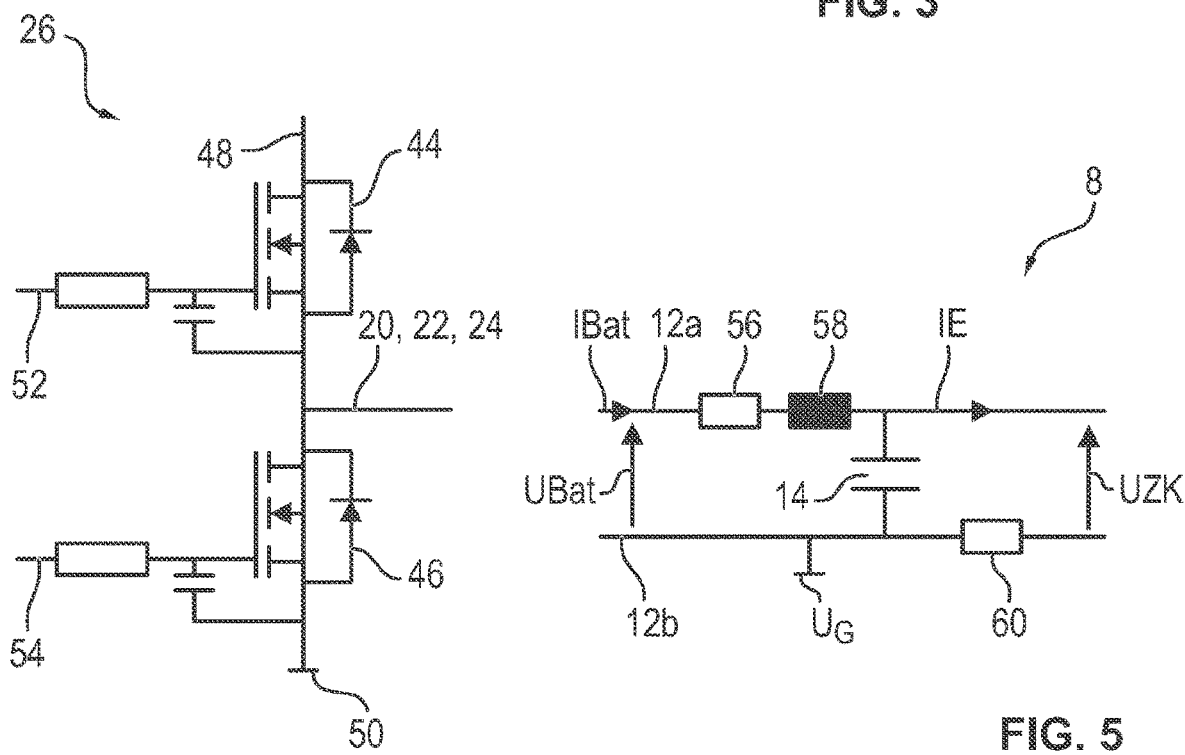
FIG. 4
FIG. 5

METHOD FOR OPERATING A BRUSHLESS AND SENSORLESS MULTI-PHASE ELECTRIC MOTOR, AND DRIVE DEVICE WITH AN ELECTRIC MOTOR

CROSS-REFERENCE TO RELATED APPLICATION

This application is a continuation, under 35 U.S.C. § 120, of copending International Patent Application PCT/EP2020/ 078677, filed Oct. 13, 2020, which designated the United States; this application also claims the priority, under 35 U.S.C. § 119, of German Patent Application DE 10 2019 215 853.6, filed Oct. 15, 2019; the prior applications are herewith incorporated by reference in their entirety.

FIELD AND BACKGROUND OF THE INVENTION

The invention relates to a method for operating a brushless and sensorless multiphase electric motor. The invention furthermore relates to an electric drive, in particular for an adjustment element (adjustment system) of a motor vehicle, having an electric motor operated in accordance with the method.

Adjustment systems operated or driven by electric motors, as motor vehicle components, such as for example window lifters, seat adjustment systems, door and sunroof drives or cooling fan drives, as well as pumps and interior fans, typically have an electric drive with a controlled electric motor. For electromotive drives of this kind, so-called brushless electric motors (brushless DC motors, BLDC motors) are being used increasingly often. In these motors, the brush elements of a rigid (mechanical) commutator, which are susceptible to wear, are replaced by an electronic commutation of the motor current.

Electromotive drives for motor vehicles are generally fed by a (high-voltage) battery, which forms the vehicle-internal energy storage device, and from which the electric motor is supplied with electrical energy in the form of a direct current (DC voltage). In order to convert the direct current into the motor current, a converter (inverter) is suitably interconnected between the energy storage device and the electric motor. The converter has a bridge circuit, which is supplied with the direct current or DC voltage of the energy storage device via an electric intermediate circuit. The motor current is generated as a multiphase output current by way of pulse-width-modulated (PWM) actuation or control of semiconductor switches of the bridge circuit. The semiconductor switches are switched over between an on and an off state in a clocked manner by way of the pulses of the PWM signals.

During operation, the bridge circuit feeds the electric motor current (three-phase current) into the stator coils of the electric motor, said motor current consequently generating a rotary magnetic field that rotates with respect to the rotor. In this case, the rotor of the electric motor suitably has a number of permanent magnets, wherein the interaction of the permanent magnets with the rotary field produces a resulting torque, which sets the rotor in rotation.

The phases of the three-phase current generated by the bridge circuit and of the associated rotary field are referred to as (motor) phases. In a figurative sense, this is also understood to mean the stator coils (phase winding) associated in each case with such a phase, the stator coils having the associated connection lines (phase end). In this case, the phases are interconnected with one another in a star point of a star circuit, for example.

For efficient operation, it is necessary for the phases to be supplied with current at the correct time. To this end, it is necessary to accurately determine the relative position of the rotor and the stator for motor control/regulation.

In this case, observer-based control and/or regulation (closed-loop control) of the electric motor is conceivable, for example. What is known as an observer (or monitor) takes part in such an observation method, based on the system equations of the electric motor or drive. From a comparison of the expected motor states from the observer with the measured values, it is possible to ascertain the actual state and thus a rotation variable, that is to say the rotor position and/or the rotational speed.

The rotor position for the position determination is ascertained, for example, by means of additional rotary sensors, such as a Hall sensor, for example. However, rotary sensors or encoders of this kind are costly, for which reason position determination should preferably be carried out without sensors.

The sensorless position determination is based, for example, on the detection of induced current and/or voltage signals due to the back EMF, which induces the rotating permanent magnets in the phase windings. The induced back-EMF signals are proportional to the rotational speed of the rotor, as a result of which, disadvantageously, only little or no information about the position determination is available for motor control at low rotational speeds or at a standstill of the electric motor. In particular, the signal-to-noise ratio is reduced at low rotational speeds. There is also a limitation of this kind for flux-based sensorless measurement methods. As a result, position determination or position identification below a threshold rotational speed is generally not possible, as a result of which safe and reliable operation of the electric motor, in particular during start-up from standstill or during operation at a low rotational speed, is disadvantageously made difficult.

In order to reach and/or exceed the threshold rotational speed, it is possible, for example, to align the drive or the rotor without knowledge of the exact rotor position and subsequently to accelerate same by means of an acceleration ramp in a step mode. A voltage vector, which rotates the rotor into a predetermined position (starting position), is generally used for the alignment. To this end, for example, a phase is connected to a reference potential, such as a ground, for example, and the other phases are supplied with a pulse-width-modulated regulation signal. The magnetic field generated thereby consequently aligns the rotor so that the rotor is moved to a defined starting position.

It is a disadvantage that the method requires relatively high motor or phase currents. Furthermore, the electric motor or the rotor is accelerated relatively slowly so that a long starting or start-up time is provided. There is also the risk of oscillations and the loss of the synchronous field. As a disadvantage, the acoustics of a drive operated in such a way are also worsened by the oscillations and high motor currents.

Another option for position identification is the evaluation of anisotropic properties of the drive, such as a rotor-position-dependent inductance of the phase windings, for example. This method for position identification advantageously also functions at low rotational speeds and when the rotor is at a standstill. However, disadvantageously, the method is able to be used only in drives that have corresponding properties, such as a sufficiently high dependence of the inductance on the rotor position, for example. Furthermore, relatively efficient measurement value detection is required. Moreover, the acoustic properties of the electric motor during operation are negatively influenced, as a result of which increased noise emission is produced.

SUMMARY OF THE INVENTION

It is accordingly an object of the invention to provide a method of operating a brushless and sensorless multiphase electric motor which overcomes the above-mentioned disadvantages of the heretofore-known devices and methods of this general type. In particular, the method is intended to make it possible to operate the electric motor effectively and reliably even at low rotational speeds or from standstill. It is a further object of the invention to specify an electric drive comprising an electric motor that is operated in this way.

With the above and other objects in view there is provided, in accordance with the invention, a method of operating a brushless and sensorless multiphase electric motor, the method comprising:
  determining at least two phase voltages and at least two phase currents of the electric motor;
  ascertaining a voltage vector from the phase voltages and/or ascertaining a current vector from the phase currents,
  determining a position substitute signal as a measure for a rotor position on a basis of an angle of the current vector and/or of the voltage vector;
  calculating a rotation variable on a basis of the position substitute signal; and
  controlling the electric motor on a basis of the rotation variable.

The method according to the invention is configured to operate a brushless and sensorless multiphase (e.g., three-phase) electric motor. In this case, the electric motor is, in particular, a synchronous machine, preferably a brushless DC motor, of a motor vehicle, for example an adjustment motor.

According to the method, at least two phase voltages and/or at least two phase currents of the electric motor are determined.

A (phase) voltage vector is ascertained from the phase voltages and/or a (phase) current vector is ascertained from the phase currents. The conjunction "and/or" is to be understood here and in the text which follows in such a way that the features linked by means of said conjunction can be provided together and as alternatives to one another. That is, the construct "A and/or B" should be understood to cover A alone, B alone, or A and B.

The term "controlling," unless otherwise noted, should be understood to cover open-loop control, closed-loop control, or a combination thereof.

A voltage vector and current vector are to be understood here as a respective space vector, that is to say an illustration of physical variables of a three-phase or multiphase system, such as the, in particular three-phase, electric motor, that is to say a (space) vector in a coordinate system in a complex plane. The complex plane is in this case essentially arranged effectively in a cross-sectional plane of the electric motor.

A position substitute signal is subsequently determined as a measure for a rotor position based on a (phase) angle of the current vector and/or of the voltage vector. A rotation variable of the electric motor, for example a (filtered) rotor position and/or rotational speed or speed, is calculated on the basis of the position substitute signal. The electric motor is subsequently controlled and/or regulated on the basis of the calculated rotation variable. A particularly suitable method is realized as a result.

The regulation and/or control is thus effected depending on the position substitute signal or the angle. In other words, the position substitute signal or the angle is essentially the effective fault (fault signal) or the effective control deviation for the operation of the electric motor.

The term "controlling," unless otherwise noted, should be understood to cover open-loop control, closed-loop control, or a combination thereof. The terms regulate and regulator, generally, refer to closed-loop control loops.

The rotation variable required for the control and/or regulation of the electric motor is calculated from an angle variable derived from the voltage and/or current vector or is calculated from the position substitute signal. In contrast to the prior art, the rotation variable of the electric motor is thus not determined on the basis of induced current and/or voltage signals or the back EMF, as a result of which the method is suitable even at low motor rotational speeds or in the case of a start-up from standstill. As a result, the required rotational speed from which a regulation method for the operation of the electric motor can be applied is reduced. In particular, regulation and/or control is thus made possible at low rotational speeds in a simple manner without the electric motor needing to have particular motor properties for this purpose, such as a sufficiently high dependency of the inductance on the rotor position, for example.

According to the method, the precise or exact position of the electric motor is thus not ascertained. A position substitute signal is used for control and/or regulation instead of a conventional position signal of an encoder or position sensor. Said signal is processed, for example filtered, by an observer, for example, and the rotation variable is calculated or estimated. In other words, the position substitute signal is used as input for the observer, which filters the position substitute signal and ascertains the rotor position and/or the rotational speed or the speed.

The method is carried out in particular at low motor rotational speeds, that is to say those motor rotational speeds at which no sufficient back EMF is available. The method is ended, for example, when a predetermined period has elapsed or when a stored threshold rotational speed is exceeded. In this case, the threshold rotational speed is selected, for example, in such a way that sufficient back EMF signals for a conventional sensorless control and/or regulation method are generated at motor rotational speeds greater than the threshold rotational speed.

In contrast to a "blind" rotary field specification, the method according to the invention realizes a higher start-up torque of the electric motor and thus a shorter start-up time. Furthermore, the efficiency and the acoustics of the electric motor are therefore improved. As a result, the robustness of the electric motor is significantly improved at low rotational speeds.

In contrast with conventional sensorless position identification processes, the method according to the invention does not require additional test pulses, as a result of which, on the one hand, acoustic interference caused thereby does not arise and, on the other hand, particularly simple integration is ensured. In comparison with conventional sensorless methods, the method according to the invention is particularly robust with respect to measurement noise and tolerances. The method according to the invention is also particularly simple to implement and to parameterize, with the result that a particularly low computational load is ensured.

The method according to the invention is suitable in particular for applications in which the inductances are independent of position. This means that, for example in a d/q coordinate system fixed with respect to the rotor, the inductances are equal (Ld=Lq); in this case, there is no magnetic asymmetry of the electric or synchronous motor and no reluctance contribution to the torque is generated. This means that, for example, conventional methods such as an INFORM method (indirect flux detection by online reactance measurements) cannot be applied. In contrast thereto, the method according to the invention is able to be used both for position-dependent (Ld≠Lq) and position-independent (Ld=Lq) inductances.

The method according to the invention does not require an initial position identification. The control and/or regulation of the electric motor preferably synchronizes automatically.

Without targeted initialization, the position substitute signal and the rotor are at essentially random positions with respect to one another. However, this may lead to the rotor temporarily being accelerated in the opposite direction when started or started up. This is uncritical and permissible for many applications. In order to prevent this opposing start-up and to generally improve the start-up behavior, however, the method according to the invention can also be combined with an initial position or position identification method. This means that the method according to the invention is initialized with a detected rotor position.

In the case of a starting process from standstill, the next unknown (initial) starting value can be determined at least approximately, for example with the aid of position identification methods such as an INFORM method, for instance.

The invention proceeds from the idea of completely preventing or at least reducing the influence of current noise in the position identification process. In the case of a conventional EMF identification, the value of the inductance is set to be equal to zero so that the current vector and the voltage vector are located above one another in the static state. As a result, a simple and suitable shift to a conventional position identification process is also able to be realized. In other words, it is possible, for example, to deliberately accept an error in the inductance (L=0) in order thus to reduce or completely prevent errors on account of measurement errors or measurement inaccuracies.

In an advantageous development, the angle for determining the position substitute signal is determined on the basis of forming the difference between the angles of the current vector and of the voltage vector. In other words, the position substitute signal is determined on the basis of the relative phase position of the current and voltage vectors with respect to one another. As a result, a particularly suitable position substitute signal is realized.

If the phase voltage vector leads the current vector, the angle or the position substitute signal has a low value, for example. In the course of the control and/or regulation, the electric motor is subsequently in particular accelerated. If the current vector leads the voltage vector, a comparatively large difference angle or a high value of the position substitute signal is accordingly generated, such that the electric motor is subsequently decelerated, for example.

In one conceivable configuration, an additional phase angle is taken into account in the determination of the angle. As a result, the realization of the method is simplified and/or a systematic error is reduced.

This is advantageous, for example, in the case of current regulation along a q direction of the position estimation, since the position direction and the current vector thus have an offset of 90°. As a result, the determination of the angle or of the position substitute signal can be simplified to the effect that the difference of the (phase) angle of the voltage vector and of the offset are used. As a result, it is not necessary to determine the angle of the current vector in addition.

In a further embodiment, the position direction and the phase voltage vector have an offset of 90° in the steady state of the electric motor, such that the offset can be taken into account accordingly.

In one preferred embodiment, the electric motor is controlled and/or regulated in such a way that the angle is minimized. In particular, in this case the relative phase position between the current vector and the phase vector is minimized. In this case, for example, the voltage drop at inductances and/or resistors is fully or partly taken into account. The angle or the relative phase position is preferably regulated to zero. In other words, the electric motor is controlled and/or regulated in such a way that the phase current and the phase voltage have the same phase position as far as possible. As a result, the influence of measurement errors and tolerances is reduced, such that a particularly reliable and dependable operation of the electric motor is ensured.

In one conceivable embodiment, in particular the phase voltages are controlled and/or regulated on the basis of the rotation variable in order to control and/or regulate the electric motor. In other words, the electric motor is operated in a manner regulated/controlled by phase voltage. As a result, an expedient and outlay-reduced operation of the electric motor is made possible.

In one possible development, the rotation variable is calculated and limited on the basis of a stored minimum speed. In this case, a minimum speed is understood to mean a minimum rotational speed or minimum rotation of the rotor, for example 10 revolutions per minute (rpm).

This additional functionality is integrated in the observer, for example. This essentially means that the speed of the observer for calculating the rotation variable is limited to the minimum speed. As a result, the calculated rotation variable increases at a minimum gradient, even if the values at the input of the observer remain constant. In other words, the rotation variable also increases in the case of a constant position substitute signal.

The minimum speed is to be understood in particular as a certain speed range or rotational speed range of the rotor. The upper limit of the minimum speed is selected here in such a way that a stationary rotor is taken along, that is to say that a slip of the rotor is prevented. The lower limit for the minimum speed is in this case a rotational speed at which a sufficient EMF effect is brought about. If the rotor speed is below the lower limit, when the rotation variable is calculated, the minimum speed subsequently causes an acceleration of the electric motor or rotor in order to increase the back EMF. Furthermore, it is thus ensured that the electric motor does not start or start up in the incorrect direction (opposite direction).

When the start speed and minimum speed is selected suitably, it is ensured that the method is synchronized independently and thus an initial position identification process is essentially not necessary. This enables a reliable and dependable start of the electric motor.

The minimum speed is preferably adjusted or varied depending on an operating point or an operating situation of the electric motor. In one suitable configuration, the value of the minimum speed is adjusted here in particular in a manner dependent on temperature. In other words, the value of the minimum speed is preferably varied depending on the operating temperature. As a result, a particularly flexible method is realized, which adjusts to the respective operating situation or operating temperature of the electric motor.

In addition or as an alternative, it is conceivable, for example, that the minimum speed is varied or changed over a period, for example over the starting process. It is thus advantageous, for example, to select the minimum speed to be low or close to zero in order to better catch the rotor with the rotary field generated and in order to subsequently increase the value in order to bring about a sufficient speed or acceleration of the rotor.

An additional or further aspect of the invention makes provision for the angle for determining the position substitute signal to be increased depending on an operating situation or an operating point of the electric motor. The poles or zeros of the control circuit during operation of the electric motor are dependent on the operating situation. As a result, the control deviation, that is to say the position substitute signal or the angle, is influenced in a targeted manner close to the poles or zeros so that reliable control and/or regulation of the operation is always made possible. For example, the angle is divided here by the absolute value of a drive voltage or the rotational speed.

In one possible embodiment, a Clarke transformation, that is to say an ab or αβ transformation, of the phase voltages and/or phase currents is carried out in order to ascertain the voltage vector and/or the current vector. This means that the current and voltage vectors are generated in a coordinate system fixed with respect to the stator. As a result, the accuracy of the position substitute signal is improved and particularly effective control and/or regulation of the electric motor, in particular when starting up from standstill, is thus made possible.

In an alternative embodiment, the voltage and/or current vectors are determined by means of a Park transformation, that is to say a dq transformation. This means that the current and voltage vectors are generated in a coordinate system fixed with respect to the rotor, that is to say in a rotating coordinate system.

The electric drive according to the invention is embodied as an adjustment drive of a motor vehicle, for example. To this end, the drive has a brushless and sensorless multiphase electric motor and a vector device for ascertaining the voltage vector and/or the current vector, and also a controller for determining the position substitute signal. The drive furthermore has an observer for determining the rotation variable without a sensor based on the position substitute signal, and a current regulator for controlling and/or regulating the electric motor, in particular by means of pulse width modulation or space vector modulation.

The drive, or the vector device and the controller and the observer and the current regulator, are in this case generally suitable and set up—in terms of program and/or circuit technology—to carry out the method described above. The vector device is thus specifically set up to calculate corresponding space vectors, that is to say voltage and/or current vectors, based on the determined, for example measured or calculated, phase voltages and/or phase currents. The calculated voltage and/or current vectors are fed to the controller, which determines the position substitute signal based on an angle of the voltage and/or current vectors.

The position substitute signal is fed to the observer, which for example filters the position signal—and evaluates it similarly to a back EMF signal—and thus calculates or estimates the rotation variable, that is to say the rotor position and/or the (rotor) rotational speed. This calculated or estimated rotation variable is fed to the current regulator as a manipulated variable.

In a preferred configuration, the vector device and/or the controller and/or the observer and/or the current regulator are at least essentially formed by a microcontroller having a processor and a data memory in which the functionality for carrying out the method according to the invention, or the respective method steps, is implemented in terms of program technology in the form of operating software (firmware), with the result that the method or the method steps is or are carried out automatically when the operating software is executed in the microcontroller—possibly in interaction with a user.

Alternatively, within the context of the invention, the vector device and/or the controller and/or the observer and/or the current regulator can also each be formed by a non-programmable electronic component, for example an ASIC (application-specific integrated circuit) or an FPGA (field-programmable gate array), in which functionality for carrying out the method is implemented using circuitry means.

The drive or the electric motor operated with the method therefore has an improved behavior with respect to a start-up or start from a standstill and with respect to permanent or continuous operation with low rotational speeds.

In one conceivable embodiment, the electric motor is connected in particular to a bridge circuit of a power converter, said bridge circuit converting a DC voltage of an intermediate circuit to an AC voltage for driving or operating the electric motor. The drive therefore has a DC input or DC connection. The bridge circuit is controlled and/or regulated by the current regulator for example in terms of signal technology.

Depending on the switching states of the power semiconductor switches of the bridge circuit, a phase current flows via a shunt. The voltage drop across the shunt is amplified and evaluated, for example. The phase currents are reconstructed using measurements and the knowledge of the switching states of the power semiconductor switches. As an alternative, it is likewise conceivable, for example, that the phase currents are measured directly or indirectly. Together with the measured and/or calculated phase voltages, the phase voltages and phase currents are thus available to the vector device in order to ascertain the voltage vector and/or the current vector.

In one conceivable embodiment, the vector device and the controller are embodied as a joint component, for example.

Other features which are considered as characteristic for the invention are set forth in the appended claims.

Although the invention is illustrated and described herein as embodied in a method for operating a brushless and sensorless multi-phase electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 1 shows an electric (electromotive) drive having a current source and having an electric motor as well as having a power converter interconnected in between;

FIG. 3 shows three phase windings of a three-phase electric motor connected in a star circuit;

FIG. 4 shows a bridge module of a bridge circuit of the power converter for actuating a phase winding of the electric motor;

FIG. 5 shows an equivalent circuit diagram of the current source;

DETAILED DESCRIPTION OF THE INVENTION

Mutually corresponding parts and variables are provided with the same reference signs throughout the figures.

Figure 1:
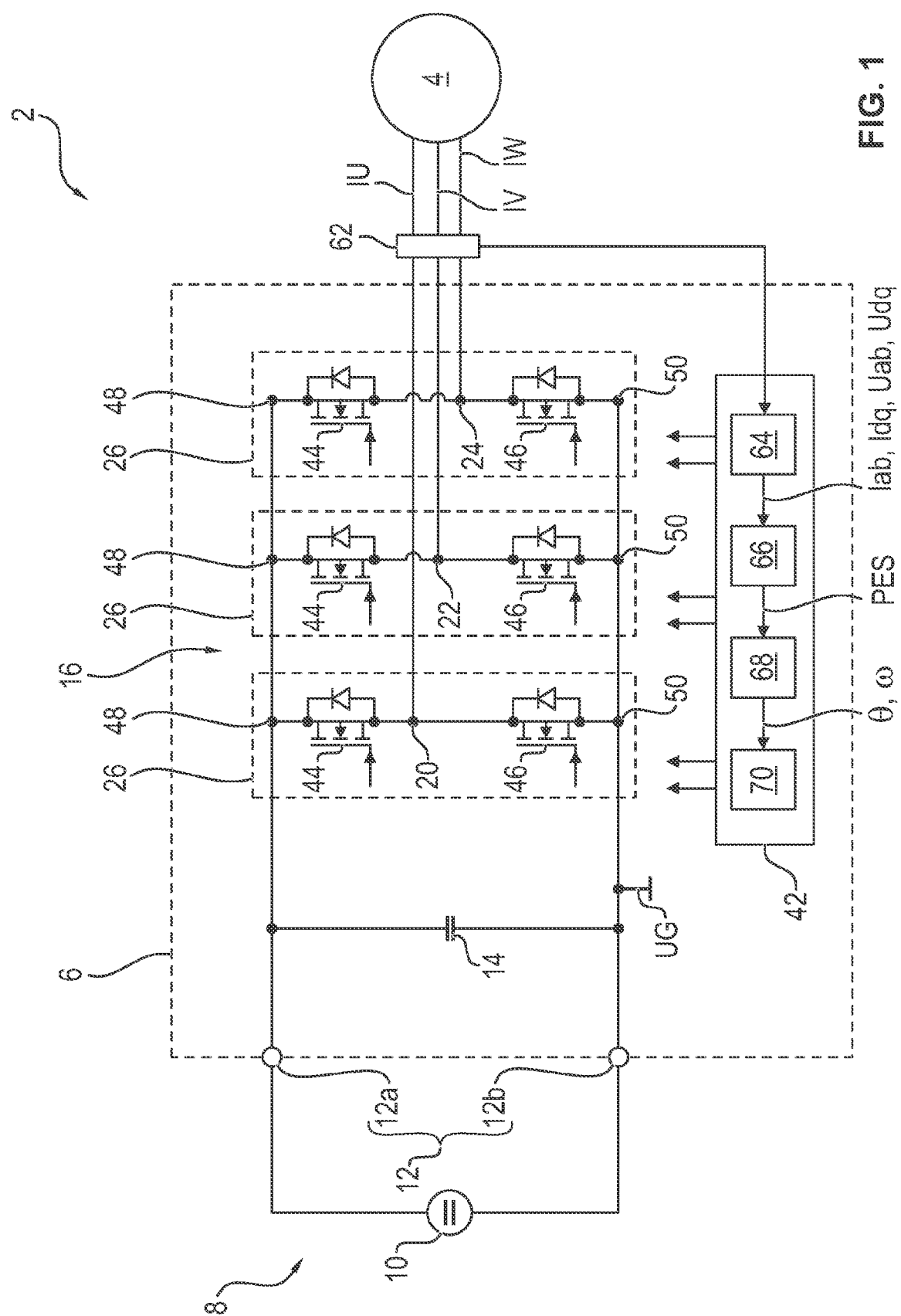

FIG. 1 shows an electric or electromotive drive 2 for an adjustment system of a motor vehicle, for example a window lifter or a seat adjustment system. The drive 2 comprises a brushless and sensorless three-phase electric motor 4, which is connected to a current source (voltage supply) 8 by way of a power converter 6. In this exemplary embodiment, the current source 8 comprises a vehicle-internal energy storage device 10, for example in the form of a (motor vehicle) battery, and a (DC) intermediate circuit 12, which is connected to said energy storage device and which extends at least partly into the power converter 6.

The intermediate circuit 12 is essentially formed by an outgoing line 12a and a return line 12b, by means of which the power converter 6 is connected to the energy storage device 10. The lines 12a and 12b are fed at least partly into the power converter 6, in which an intermediate circuit capacitor 14 and a bridge circuit 16 are interconnected between said lines.

During the operation of the drive 2, an input current IE which is fed to the bridge circuit 16 is converted to a three-phase output current (motor current, three-phase current) IU, IV, IW for the three phases U, V, W of the electric motor 4. The output currents IU, IV, IW, which are subsequently also referred to as phase currents, are fed to the corresponding motor phases or phases (phase windings) U, V, W (FIG. 3) of a stator, which is not illustrated in any more detail.

FIG. 3 illustrates a star circuit 18 of the three phase windings U, V, W. The phase windings U, V, W are fed to a respective bridge module 26 (FIG. 3) of the bridge circuit 16 by way of a respective (phase) end 20, 22, 24, and are interconnected by way of the respective opposite end with one another in a star point 28 as common connecting terminal.

In the illustration of FIG. 3, the phase windings U, V and W are each shown by means of an equivalent circuit diagram in the form of an inductance 30 and an ohmic resistor 32 and a respective voltage drop 34, 36, 38. The voltage 34, 36, 38 dropped in each case across the phase winding U, V, W is schematically represented by arrows and results from the sum of the voltage drops across the inductance 30 and the ohmic resistor 32 and the induced voltage or the induced phase current 40. The phase current 40 (back EMF) induced by way of a movement of a rotor of the electric motor 4 is schematically illustrated in FIG. 3 using a circle.

The star circuit 18 is actuated by means of the bridge circuit 16. The bridge circuit 16 is embodied together with the bridge modules 26 in particular as a B6 circuit. In this embodiment, during operation, at each of the phase windings U, V, W there is a switchover, clocked at a high switching frequency, between a high (DC) voltage level of the outgoing line 12a and a low voltage level of the return line 12b. The high-voltage level is in this case in particular an intermediate circuit voltage UZK of the intermediate circuit 12, wherein the low voltage level is preferably a ground potential UG. This clocked actuation is embodied as a PWM actuation—illustrated in FIG. 1 by means of arrows—by way of a device 42 as regulator, by way of which control and/or regulation of the rotational speed, the power and the direction of rotation of the electric motor 4 is possible.

The bridge modules 20 each comprise two semiconductor switches 44 and 46, which are illustrated in FIG. 3 purely schematically and by way of example for the phase W. The bridge module 26 is connected on one side to the outgoing line 12a and thus to the intermediate circuit voltage UZK by way of a potential connection 48. On the other side, the bridge module 26 is contact-connected to the return line 12b and thus to the ground potential UG by way of a second potential connection 50. The respective phase end 20, 22, 24 of the phase U, V, W is able to be connected either to the intermediate circuit voltage UZK or to the ground potential UG by means of the semiconductor switches 44, 46. If the semiconductor switch 44 is closed (on) and the semiconductor switch 46 is opened (off), the phase end 20, 22, 24 is connected to the potential of the intermediate circuit voltage UZK. Accordingly, when the semiconductor switch 44 is opened and the semiconductor switch 46 is closed, the phase U, V, W is contact-connected to the ground potential UG. As a result, by means of the PWM actuation of the device 42, it is possible to supply two different voltage levels to each phase winding U, V, W.

FIG. 4 illustrates an individual bridge module 26 in a simplified manner. In this exemplary embodiment, the semiconductor switches 44 and 46 are realized as MOSFETs (metal-oxide semiconductor field-effect transistor), which switch over between an on state and an off state in a clocked manner by means of the PWM actuation. To this end, the respective gate connections are fed to corresponding control voltage inputs 52, 54, by means of which the signals of the actuation 42 are transmitted.

FIG. 5 shows an equivalent circuit diagram for the current source 8. During operation, the energy storage device 10 generates a battery voltage UBat and a corresponding battery current IBat to operate the power converter 6. In FIG. 5, the internal resistance of the energy storage device 10 is illustrated as an ohmic resistor 56 and an inherent inductance of the energy storage device 10 is illustrated as an inductance 58. A shunt resistor 60, at which the intermediate circuit voltage UZK drops, is connected in the return line 12b.

In the exemplary embodiment of FIG. 1, the phase currents IU, IV, IW are detected by means of an ammeter 62 and fed to the device 42. A vector device 64 determines from the detected phase currents IU, IV, IW and calculated phase voltages UU, UV, UW a current vector and a voltage vector in a coordinate system. The coordinate system may be an ab system fixed with respect to the stator or a dq system fixed with respect to the rotor, with the result that the corresponding current vectors are denoted as Iab and Idq and the voltage vectors are denoted as Uab and Udq in the following text. Components of the current or voltage vectors along a coordinate axis a, b, d, q are accordingly denoted as Ia, Ib, Id, Iq and Ua, Ub, Ud, Uq.

The current vector Iab, Idq and the voltage vector Uab, Udq are transmitted to a controller 66, which determines a position substitute signal PES on the basis of an angle α of the voltage and/or current vectors Iab, Idq, Uab, Udq.

The angle α is determined for example by forming the difference between the phase angles of the current vector Iab, Idq and of the voltage vector Uab, Udq, that is to say as a relative phase position. To this end, for example, the phase angles αU and αI of the voltage vector Uab, Udq and the current vector Iab, Idq are determined by means of an expanded arctangent function, what is known as the arctan 2 function (atan 2), and the difference is subsequently formed. Therefore, the result in the ab system is for example:

$$\alpha=\text{atan } 2(Ua,Ub)-\text{atan } 2(Ia,Ib).$$

The angle α is multiplied, for example, by an amplification factor, an algebraic sign, or a scaling factor k1.

The position substitute signal PES is fed to an observer 68, which, for example, filters the position substitute signal PES and calculates or estimates a rotation variable θ, ω, that is to say the rotor position θ and/or the (rotor) rotational speed ω. This calculated or estimated rotation variable θ, ω is fed as a manipulated variable to a current regulator 70, which generates the PWM actuation signals. In this case, it is possible, for example, that the position substitute signal PES is used as manipulated variable instead of the rotation variable θ.

When the rotation variables θ, ω are calculated, the difference between the expected value θ, ω and the position substitute signal PES is preferably formed. This "error" is used as a control deviation for correcting the expected values θ, ω. As an alternative thereto, the angle α can also be used as input variable and be interpreted as "error" or "error signal." As a result, the required computational load is reduced.

The current regulator 70, or current controller 70, controls (open loop) and/or regulates (closed-loop) the operation of the electric motor 4 in particular to the extent that the angle α is minimized, preferably regulated to zero.

Figure 2:
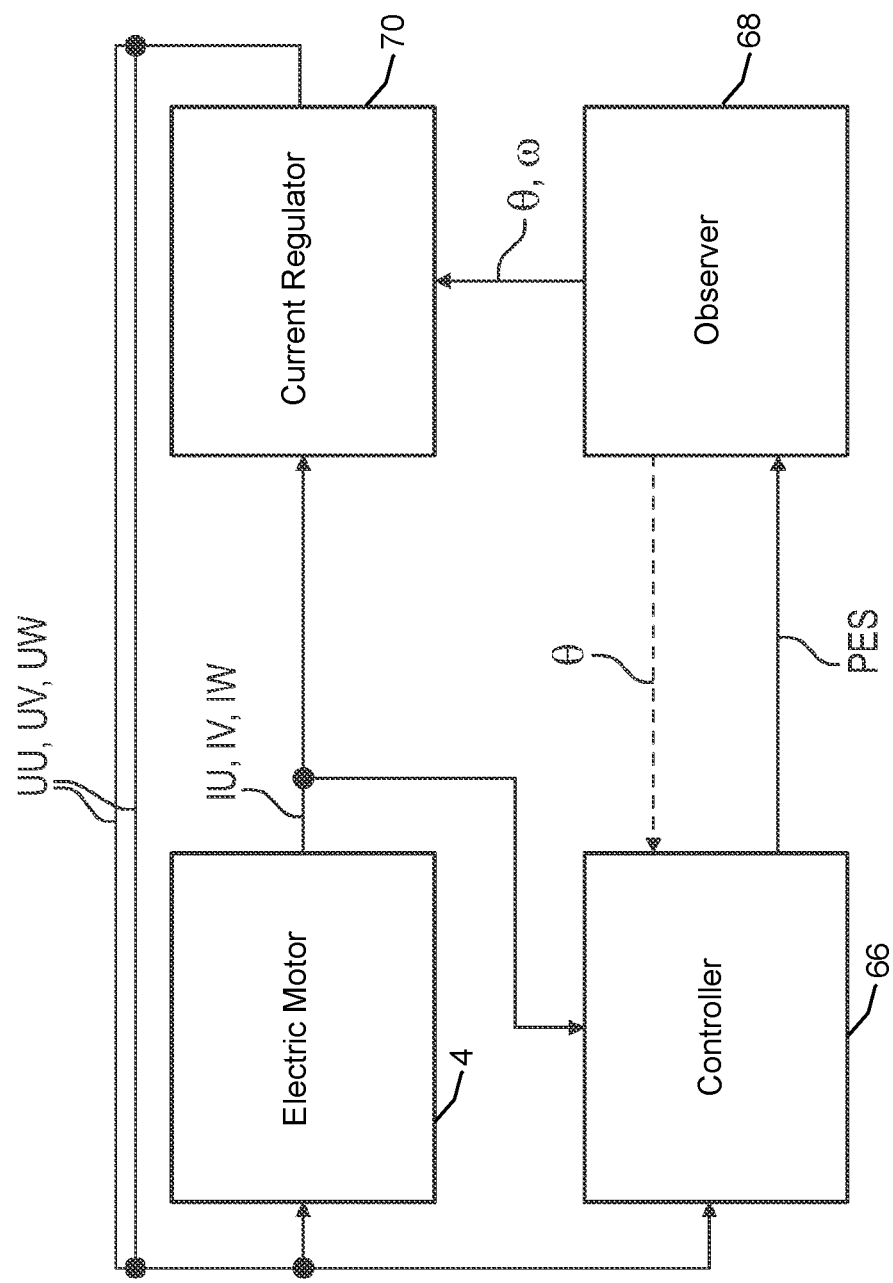
FIG. 2 shows a phase-voltage-regulated drive.

FIG. 2 shows a relatively simple illustration of an embodiment of the drive 2, in which phase-voltage-regulated operation of the electric motor 4 is made possible. In this embodiment, the vector device 64 or the functionality thereof is integrated into the controller 66. In this embodiment, the phase currents IU, IV, IW and the phase voltages UU, UV, UW are measured or detected directly and fed to the controller 66.

The function of the controller 66 and that of the observer 68 is explained in more detail below based on FIGS. 6 to 10 and based on a plurality of exemplary embodiments.

Figure 6:
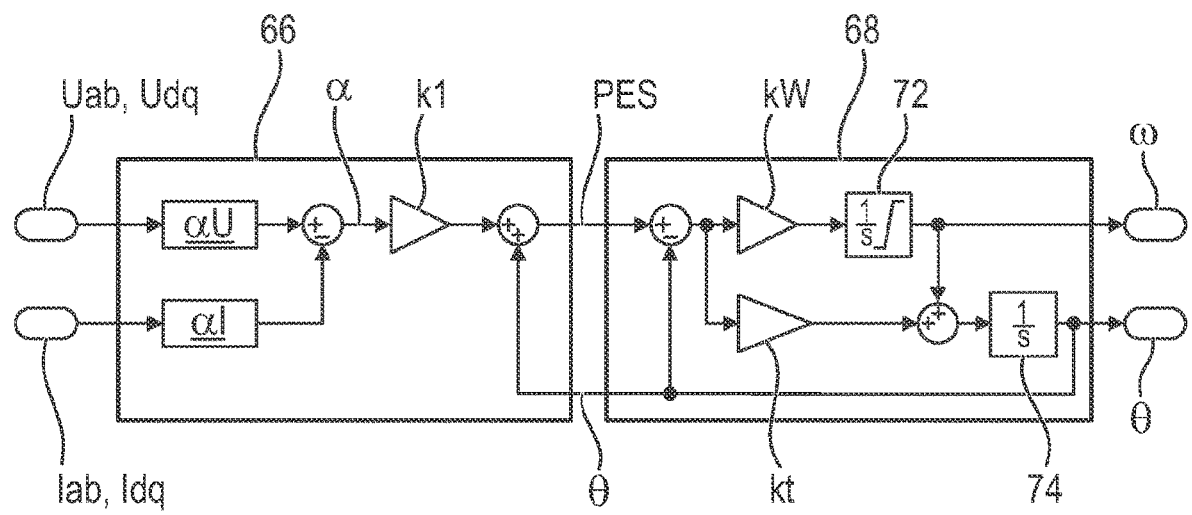
FIG. 6 shows a controller and an observer of the drive in a first embodiment.

In the exemplary embodiment according to FIG. 6, the rotor position θ determined by the observer 68 is fed back to the controller 66 and added to the angle α in order to generate the position substitute signal PES. In the observer 68, the rotor position θ is subtracted again and the rotation variables θ, ω are determined based on the angle α. Typical methods—such as incremental sensors, for example—ascertain a position, which is subsequently processed in the observer. This conventional structure is reproduced by the addition and subtraction, such that simple implementation of the method in existing systems is made possible.

In order to determine the rotational speed or speed ω, the angle α is multiplied by a factor kw. The rotational speed ω is subsequently calculated by means of integration 72 over time. In order to determine the rotor position θ, the angle α is multiplied by a factor kt, and the speed ω or the change in rotor position is subsequently added. The new rotor position θ is then calculated by way of a division 74 of the elapsed period.

Figure 7:
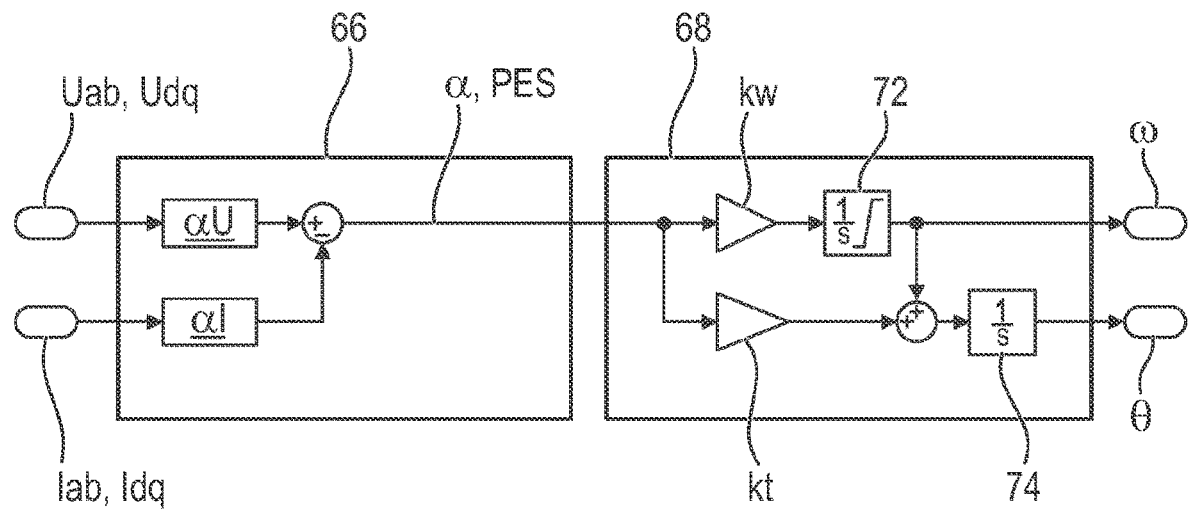
FIG. 7 shows the controller and the observer in a second embodiment.

In the exemplary embodiment according to FIG. 7, the angle α is sent directly to the observer 68 as position substitute signal PES. The controller 66 thus generates the angle α as an error signal or control deviation for the observer 68.

Figure 8:
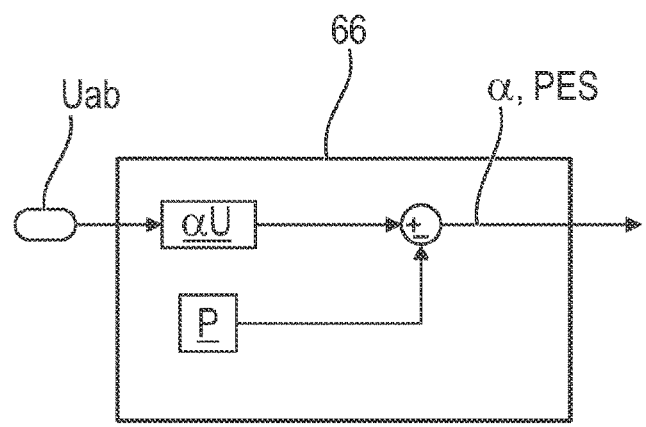
FIGS. 8 to 10 show the controller in various embodiments.

FIG. 8 shows an exemplary embodiment of the controller 66, which is suitable and set up in particular for the drive 2 illustrated in FIG. 2. In this exemplary embodiment, the current regulator 70 regulates the current in the q direction of the position estimation. This means that the current component Id is equal to zero (Id=0). As a result, the position direction and the current vector Iab correspond to an offset or phase angle P of 90° or Π/2. As a result, a simplified configuration of the controller 66 is possible.

Figure 9:
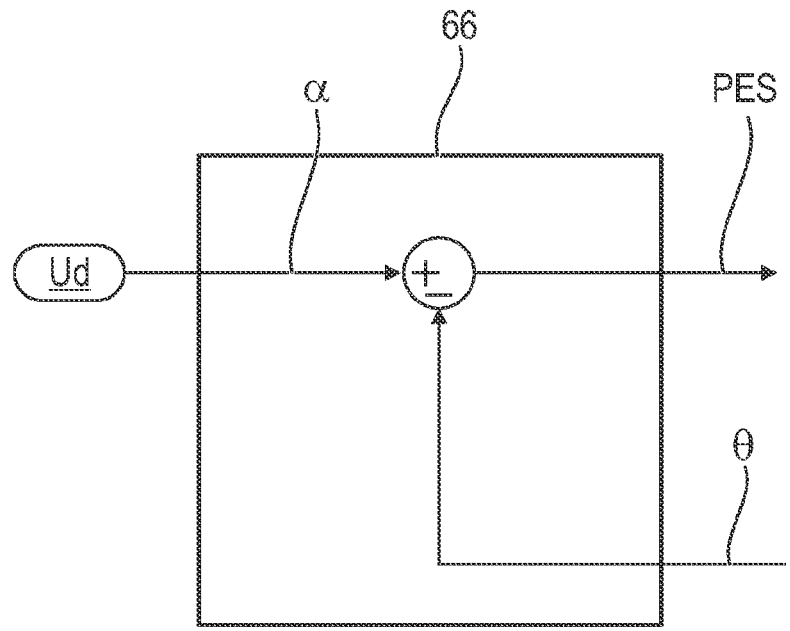

In the exemplary embodiment according to FIG. 9, the current is regulated by the current regulator 70 in the q direction of the position estimation (Id=0). Therefore, it is sufficient to consider only the voltage component Ud in order to identify whether the phase voltage leads or lags the phase current. In an embodiment without feedback of the rotor position θ, the voltage component Ud or the corresponding angle α is multiplied by a factor k1 equal to negative 1 (k1=−1) and is sent as position substitute signal PES.

Figure 10:
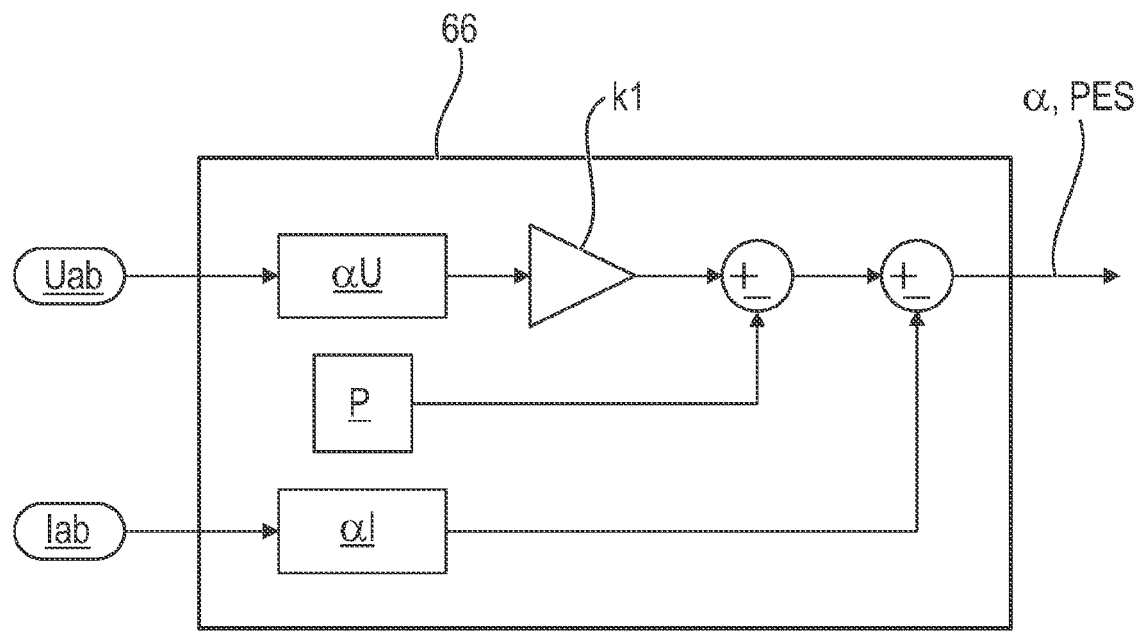

The exemplary embodiment of FIG. 10 shows an embodiment of the controller 66 in a steady state of the electric motor 4. If the electric motor 4 is in the steady state, the position direction and the voltage vector Uab, Udq correspond to an offset or phase angle P of 90° or Π/2. In this embodiment, the voltage angle αU is multiplied by a factor k1=2. In other words, regulation is carried out with respect to the square of the phase voltage. The phase angle P is subsequently subtracted therefrom and the difference with respect to the current angle αI is formed in order to generate the angle α or the position substitute signal PES.

It will be understood that the invention is not restricted to the exemplary embodiments described above. Rather, other variants of the invention can also be derived therefrom by the person skilled in the art without departing from the subject matter of the invention. In particular, furthermore, all individual features described in association with the exemplary embodiments are also able to be combined with one another in a different way, without departing from the subject matter of the invention.

The control and/or regulation method and the device 42 can be combined with an initial position or position identification method.

Furthermore, it is conceivable, for example, that the speed of the observer 68 is limited to a minimum speed for calculating the rotation variable θ, ω. As a result, the calculated rotation variable θ, ω increases with a minimum gradient, even if the values at the input of the observer 68 remain constant.

For example, it is possible that the angle α for determining the position substitute signal PES is increased by means of the factor k1 depending on an operating situation or an operating point of the electric motor 4. In this case, the minimum speed is also preferably adjusted or varied depending on the operating point or an operating situation of the electric motor 4. The value of the minimum speed in this case is preferably adjusted in particular in dependence on a temperature.

The following is a summary list of reference numerals and the corresponding structure used in the above description of the invention:

2 Drive
4 Electric motor
6 Power converter
8 Current source
10 Energy storage device
12 Intermediate circuit
12a Outgoing line
12b Return line
14 Intermediate circuit capacitor
16 Bridge circuit
18 Star circuit
20, 22, 24 Phase end
26 Bridge module
28 Star point
30 Inductance
32 Resistance
34, 36, 38 Voltage drop
40 Phase current
42 Apparatus/regulator
44, 46 Semiconductor switch
48, 50 Potential connection
52, 54 Control voltage input
56 Resistance
58 Inductance
60 Shunt resistor
62 Ammeter
64 Vector device
66 Controller
68 Observer
70 Current regulator
72 Integration
74 Division
IE Input current
IU, IV, IW Phase current
U, V, W Phase
UZK Intermediate circuit voltage
UG Ground potential
IBat Battery current
UBat Battery voltage
UU, UV, U Phase voltage
Iab, Idq Current vector
Uab, Udq Voltage vector
Ia, Ib, Id, Iq Current vector component
Ua, Ub, Ud, Uq Voltage vector component
αI Current angle/phase position
αU Voltage angle/phase position
α Angle
PES Position substitute signal
k1, kw, kt Factor
θ Rotation variable/rotor position
ω Rotation variable/rotational speed
P Phase angle/offset

The invention claimed is:

1. A method of operating a brushless and sensorless multiphase electric motor, the method comprising:
   determining at least two phase voltages and at least two phase currents of the electric motor;
   ascertaining a voltage vector from the phase voltages and a current vector from the phase currents,
   determining a position substitute signal as a measure for a rotor position on a basis of an angle formed by a difference between the angle of the current vector and the voltage vector;
   calculating a rotation variable on a basis of the position substitute signal; and
   controlling the electric motor on a basis of the rotation variable.

2. The method according to claim 1, wherein the controlling step comprises controlling with an open-loop control or a closed-loop control.

3. The method according to claim 1, which comprises taking into account an additional phase angle in determining the angle of the current vector.

4. The method according to claim 1, which comprises controlling the electric motor to thereby minimize the angle of the current vector.

5. The method according to claim 1, which comprises controlling the phase voltage of the electric motor on a basis of the rotation variable.

6. The method according to claim 1, which comprises limiting the rotation variable on a basis of a stored minimum speed.

7. The method according to claim 6, which comprises adjusting a value of the minimum speed in dependence of a temperature.

8. The method according to claim 1, which comprises increasing the angle for determining the position substitute signal depending on an operating situation.

9. The method according to claim 1, which comprises carrying out a Clarke transformation of the phase voltages and/or phase currents in order to ascertain the voltage vector and/or the current vector.

10. The method according to claim 1, which comprises carrying out a Clarke transformation of the phase voltages in order to ascertain the voltage vector.

11. The method according to claim 1, which comprises carrying out a Clarke transformation of the phase currents in order to ascertain the current vector.

12. An electric drive, comprising:
   a brushless and sensorless multiphase electric motor;
   a vector device for ascertaining a voltage vector and/or a current vector;
   a controller connected to said electric motor for determining a position substitute signal;
   an observer connected to said controller for determining a rotation variable without a sensor; and
   a current regulator for controlling said electric motor; and
   wherein said electric motor, said vector device, said controller, and said observer are commonly configured for carrying out the method according to claim 1.

13. The electric drive according to claim 12, wherein said current regulator is configured to control said electric motor by open-loop control or by closed-loop control.

14. A method of operating a brushless and sensorless multiphase electric motor, the method comprising:
   determining at least two phase voltages and at least two phase currents of the electric motor;
   ascertaining at least one of a voltage vector from the phase voltages or a current vector from the phase currents,
   determining a position substitute signal as a measure for a rotor position on a basis of an angle of at least one of the current vector or the voltage vector;
   calculating a rotation variable on a basis of the position substitute signal; and
   controlling the electric motor on a basis of the rotation variable and to thereby minimize the angle of the current vector.

* * * * *